(12) United States Patent
Schulmeister (10) Patent No.: US 7,794,037 B2
(45) Date of Patent: Sep. 14, 2010

(54) METHOD FOR REDUCING A STRIKETHROUGH EFFECT IN INKJET PRINTING ON THIN SUBSTRATES

(75) Inventor: Peter Schulmeister, Pfaffenhofen (DE)

(73) Assignee: manroland AG, Offenbach/Main (DE)

( * ) Notice: Subject to any disclaimer, the term of this patent is extended or adjusted under 35 U.S.C. 154(b) by 173 days.

(21) Appl. No.: 12/233,548

(22) Filed: Sep. 18, 2008

(65) Prior Publication Data
US 2009/0079776 A1    Mar. 26, 2009

(30) Foreign Application Priority Data
Sep. 20, 2007    (DE)    ............ 10 2007 044 947

(51) Int. Cl.
*B41J 2/205*    (2006.01)
(52) U.S. Cl. ............... 347/15; 347/9; 347/12
(58) Field of Classification Search ........... 347/9, 347/1, 15, 432
See application file for complete search history.

(56) References Cited

U.S. PATENT DOCUMENTS

| | | | |
|---|---|---|---|
| 5,371,531 A | 12/1994 | Rezanka et al. | |
| 5,742,301 A | 4/1998 | Ikeda | |
| 6,012,809 A * | 1/2000 | Ikeda et al. | .............. 347/101 |
| 7,097,268 B2 * | 8/2006 | Nagoshi | .................. 347/16 |
| 2006/0061791 A1 * | 3/2006 | Laaspere et al. | .......... 358/1.13 |

FOREIGN PATENT DOCUMENTS

| | | |
|---|---|---|
| DE | 603 04 274 T2 | 11/2006 |
| EP | 1 168 822 A1 | 1/2002 |
| JP | 05032024 A | 2/1993 |
| JP | 2000062154 A | 2/2000 |

* cited by examiner

*Primary Examiner*—Thinh H Nguyen
(74) *Attorney, Agent, or Firm*—Crowell & Moring LLP (57) ABSTRACT

A method for reducing the strikethrough effect in inkjet printing on thin substrates is disclosed. The method includes determining a normal print quality; determining a normal quantity of ink which would be used for inkjet printing of a certain print image on a strikethrough-resistant substrate, based on the normal print quality; determining a minimal print quality for the print image to be printed; determining a maximal value for the strikethrough effect; reducing the normal quantity of ink to a reduced quantity of ink, so that the print image has at least the minimal print quality and the maximal value of the strikethrough effect is not exceeded.

17 Claims, 5 Drawing Sheets

METHOD FOR REDUCING A STRIKETHROUGH EFFECT IN INKJET PRINTING ON THIN SUBSTRATES

This application claims the priority of German Patent Document No. 10 2007 044 947.1, filed Sep. 20, 2007, the disclosure of which is expressly incorporated by reference herein.

BACKGROUND AND SUMMARY OF THE INVENTION

The invention relates to a method for reducing the strikethrough effect in inkjet printing on thin substrates, in particular on newsprint.

Today there are already known applications in which inkjet printing methods are used for printing on very thin absorbent substrates such as newsprint. A great disadvantage that occurs here, however, is the so-called strikethrough or strikethrough effect. The substrate may not be able to adequately absorb the amount of ink applied and distribute it on the surface of the substrate so that the ink passes through the substrate, e.g., via fibers in the substrate, and becomes visible on the back side of the substrate and/or print product to a certain extent. This makes two-sided printing with inkjet printing methods on thin substrates such as thin paper much more difficult or even impossible with regard to adequate print quality of the print image to be printed thereby.

For this reason, specially coated substrates and/or papers are used in some applications today to prevent the ink from penetrating too deeply into the substrate. However, this procedure ultimately results in high production costs and/or cost of materials, which is unacceptable especially with a large number of copies, such as that which is customary in the production of newspapers.

The object of the invention is to create an inexpensive method for reducing the strikethrough effect in inkjet printing on thin substrates, in particular newsprint.

According to the invention, a method for reducing the strikethrough effect in inkjet printing on thin substrates, in particular newsprint comprises: determining a normal print quality, determining a normal quantity of ink which would be used for inkjet printing of a certain print image on a strikethrough-resistant substrate on the basis of normal print quality, determining a minimal print quality for the print image to be printed, determining a maximal value for the strikethrough effect, reducing the normal quantity of ink to a reduced quantity of ink, so that the print image has at least the minimal print quality and the maximal value of the strikethrough effect is not exceeded.

With the inventive method, the strikethrough effect, which is perceived as disturbing, can be minimized or even eliminated.

Due to the fact that special paper with a strikethrough-inhibiting coating is not necessary according to this invention, substantial cost savings can be achieved with regard to the substrate, e.g., newsprint.

Another advantage of the inventive method is that by reducing the normal quantity of ink to a reduced quantity of ink, ink savings are possible to a substantial extent and thus the cost of materials for the printing process can be further reduced.

According to a further embodiment of the invention, the normal quantity of ink is defined by an ink drop volume, a geometric coverage of the print image on the substrate and a gray value of the print image, such that the reduction in the normal quantity of ink to the reduced quantity of ink is accomplished by reducing at least one of the following: the ink drop volume, the geometric coverage and the gray value.

This has the advantage that by reducing or eliminating the strikethrough effect and saving on printing ink, the predetermined minimal print quality of the print image can be achieved easily at the same time, i.e., a predetermined print quality for a given printing job, e.g., the quality stipulated by the client, can be achieved.

According to another embodiment of the invention, to determine the normal quantity of ink, a first ink drop volume corresponding to the normal quality is determined and the reduction in the normal quantity of ink to the reduced quantity of ink is achieved by reducing the first ink drop volume to a second smaller ink drop volume.

It has been recognized according to the present invention that when the ink drop is assumed to be an ideal sphere geometrically, the diameter of the ink drop is reduced to a far lesser extent when the ink drop volume is reduced by a certain percentage. Thus, with uniform resolution of a print image, i.e., with a uniform spacing of ink drops apart from one another and a reduction in the ink drop volume, the geometric coverage of the print image is reduced only slightly.

The user of the inventive method thus has sufficient access to a manipulated variable, i.e., the ink drop volume to be reduced, to reduce any strikethrough effect.

If necessary, the user may additionally increase the resolution of the print image to increase the geometric coverage and thus the quality of the print image.

According to yet another embodiment of the invention, the first ink drop volume is reduced by approximately 50% to approximately 75%.

According to a further embodiment of the invention, the first ink drop volume is determined to be less than 100 pL.

According to an alternative further embodiment of the invention, the first ink drop volume is determined to be approximately 100 pL and the second ink drop volume is determined to be approximately 50 pL to approximately 25 pL.

According to yet another further embodiment of the invention, a resolution corresponding to normal print quality is set at approximately 300 dpi for the print image.

According to an alternative further embodiment of the invention, the resolution for the print image corresponding to normal print quality is set at more than 300 dpi.

According to another embodiment of the invention, the normal quantity of ink is reduced to a reduced quantity of ink by reducing the geometric coverage of the print image on the substrate.

With this embodiment of the invention, which means optimization of the print image to the extent that with a reduced quantity of ink there is only a slight reduction in the print image quality, it is likewise possible in a simple and inexpensive manner to reduce and/or prevent a strikethrough effect to a sufficient extent.

According to a further embodiment of the invention, to determine the normal quantity of ink, tone values are defined for different regions of the print image corresponding to normal quality and the geometric coverage is reduced by defining a transfer function or gradation curve so that at least a portion of the output values of the transfer function or gradation curve is smaller than the respective input values of the transfer function or gradation curve, and by varying the defined tone values of the print image by using the tone values as input values for the transfer function or gradation curve and defining the output values of the transfer function or gradation curve as new tone values for the print image.

In other words, in this embodiment of the inventive method, the normal quantity of ink is reduced to the reduced quantity of ink by converting, i.e., recalculating, the input tone values of a print image, i.e., tone values for inkjet printing of the print image on a strikethrough-resistant substrate by means of the transfer function or gradation curve to output tone values that correspond to the minimal print quality.

According to yet another embodiment of the invention, the transfer function or gradation curve is defined so that tone values of the print image remain unchanged in the light range and tone values of the print image are reduced near a full tone.

According to another embodiment of the invention, to determine the normal quantity of ink, a raster image is printed for the print image and the geometric coverage is reduced by forming a bit-oriented or pixel-oriented mask, whose raster structure is reduced quantitatively in comparison with that of the raster image, and mapping the raster image through the bit-oriented or pixel-oriented mask so as to form a reduced raster image.

In other words, a print image, e.g., a fully ripped bit map, i.e., a finished raster image, is "thinned out" by means of the bit-oriented or pixel-oriented mask which may be hardware-based or software-based, for example, through a logic link with this mask, so that the strikethrough effect is reduced or minimized and the minimal print quality is achieved.

According to a further embodiment of the invention, the raster structure of the bit-oriented or pixel-oriented mask is embodied so that it is 50% reduced quantitatively in comparison with that of the raster image.

According to yet another embodiment of the invention, for determining the normal quantity of ink, a raster image of the print image is defined and the geometric coverage is reduced by removing a certain number of pixels in contiguous areas of the raster image so as to form a reduced raster image.

This embodiment of the invention is advantageous in particular with repeating print images because a print image with a reduced number of pixels accordingly, in which the quantity of ink is reduced and the minimal print quality is met, can be reused repeatedly for printing.

According to a further embodiment of the invention, for inkjet printing of text with character sets, i.e., fonts provided for this purpose, a certain number of pixels are removed, so that the respective contours of the characters and/or letters are retained.

In other words, pixels are removed in a targeted manner so that the contour of the individual letters is maintained, such that in places where the strikethrough effect is manifested in particular, namely in the large contiguous areas of characters, matrix dots are removed in a targeted manner, so that there are no obvious gaps between the matrix dots.

According to another embodiment of the invention, the reduction in the normal quantity of ink to the reduced quantity of ink is achieved by reducing the gray value of the print image.

According to this embodiment of the invention, it is likewise possible in a simple manner to reduce the quantity of ink applied, so that the strikethrough effect is reduced and/or prevented and nevertheless the minimal print quality is achieved.

According to a further embodiment of the invention, fonts having a gray value of less than 100% are defined for inkjet printing of text.

In other words, text character sets and/or text fonts that are normally predefined in full color tones are defined according to the present invention with a gray value of less than 100%, so that the geometric coverage of the respective print image, i.e., of the individual characters, is reduced.

The present invention is described in greater detail below on the basis of preferred embodiments and with reference to the accompanying figures.

DETAILED DESCRIPTION OF THE DRAWINGS

Figure 1A:
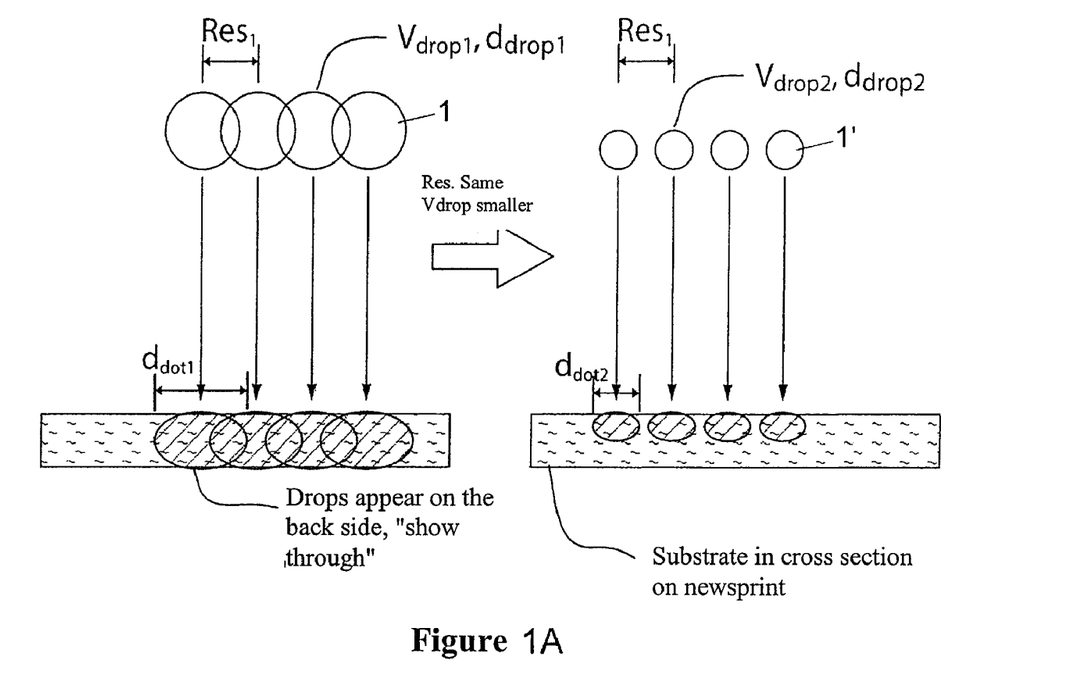
FIG. 1A shows schematically the reduction in ink drop volume of ink drops for a print image according to a first embodiment of the invention.

FIG. 1A shows schematically the reduction in the volume of ink drop 1 for a certain print image on a thin substrate according to a first embodiment of the invention. According to this embodiment, the thin substrate is embodied as newsprint.

According to the invention, a quantity of ink which is used for inkjet printing is defined by an ink drop volume $V_{drop}$, a geometric coverage of the print image on the newsprint and a gray value of the print image.

According to this invention, the ink drop volume $V_{drop}$ is considered to be approximately equivalent to the volume of an ideal sphere, such that the following equation holds for a sphere:

$$V = \frac{4}{3}r^3\pi$$

and where V denotes the volume of the sphere, r is the radius of the sphere and $\pi$ is the constant factor of the circle ($\approx 3.14$).

Accordingly, the ink drop volume $V_{drop}$ can be defined according to the following equation:

$$V_{drop} = \frac{1}{6}d_{drop}^3\pi,$$

where $d_{drop}$ corresponds to the diameter of the drop of printing ink. In other words, the ink drop volume $V_{drop}$ is approximately proportional to the third power of the ink drop diameter $d_{drop}$.

Solving for the ink drop diameter $d_{drop}$ thus yields the following:

$$d_{drop} = \sqrt[3]{\frac{6}{\pi} V_{drop}}$$

FIG. 1A shows generally valid size ratios, where a first ink drop volume $V_{drop1}$ of a normal quantity of ink such as that which would be used for inkjet printing of a print image on relatively thick paper and/or strikethrough-resistant paper may amount to approximately 100 pL (picoliter) to several hundred according to this embodiment.

The spacing of ink drop 1 is known as print resolution or resolution Res, the conventional resolution Res today being up to 300 dpi (dots per inch).

Ink drop volume $V_{drop}$ and/or ink drop diameter $d_{drop}$ has a significant influence on an ink dot diameter $d_{dot}$ on the newsprint in addition to the influences of the absorbency of the substrate and/or newsprint. Since the ink usually spreads out somewhat in printing on newsprint, an ink dot diameter $d_{dot1}$ according to the normal quantity of ink and an ink dot diameter $d_{dot2}$ according to a reduced quantity of ink in FIG. 1A (as well as in FIG. 1B) are represented symbolically as being somewhat larger than the respective ink drop diameter $d_{drop1}$ and/or $d_{drop2}$. A range of distribution of ink in the newsprint, i.e., substrate, is represented with hatching in the figure.

As shown in the diagram on the left of FIG. 1A, the ink appears on the back side of the newsprint, i.e., substrate, that is, it generates there at least an optical density that is no longer negligible and is definitely measurable. This effect, which is known as the strikethrough effect, is perceived as very troublesome on print products, so that two-sided printing of newsprint is virtually impossible from the standpoint of quality.

The reduction in the normal quantity of ink to a reduced quantity of ink will now be described with reference to FIG. 1A.

The first ink drop volume $V_{drop1}$ is defined according to the following:

$$V_{drop1} = \frac{1}{6} d_{drop1}^3 \pi$$

Thus, a first ink drop diameter $d_{drop1}$ can be derived according to the following:

$$d_{drop1} = \sqrt[3]{\frac{6}{\pi} V_{drop1}}$$

Next a minimal print quality is determined for the print image to be printed. In other words, the user of the inventive method such as a printer defines a print quality which is still acceptable, the print quality to be evaluated visually, for example, on the basis of customer specifications.

Furthermore, the user determines a maximal value for the strikethrough effect. In other words, the user defines a maximal degree, which is to be evaluated visually, e.g., on the basis of customer specifications, i.e., the maximal degree to which a print image printed on one side (front side) of the substrate, i.e., newsprint, is allowed to appear, i.e., show through, on the other side (back side) of the substrate, i.e., newsprint.

Next the normal quantity of ink is reduced to a reduced quantity of ink by reducing the first ink drop volume $V_{drop1}$ so that the print image has at least the minimal print quality and the maximal value of the strikethrough effect is not exceeded.

According to the first embodiment of the invention, the first ink drop volume $V_{drop1}$ is reduced by approximately 50% to approximately 75%, thus yielding a reduced second ink drop volume $V_{drop2}$ (for the reduced quantity of ink), which is approximately 50% to approximately 25% of the first ink drop volume $V_{drop1}$.

In other words, smaller ink drops 1' are used according to this invention, thus reducing the quantity of ink applied, and the depth of penetration of the ink becomes lower and the strikethrough effect is reduced and/or minimized.

The geometric coverage of the print image on the newsprint is also reduced but not to the same extent as the first ink drop volume $V_{drop1}$.

Figure 2:
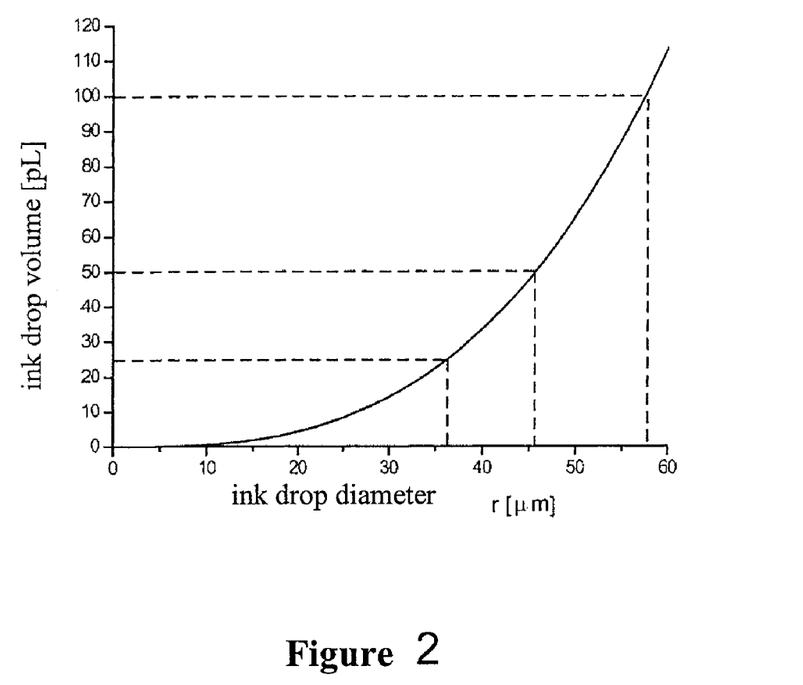
FIG. 2 shows a diagram illustrating the mathematical relationship between ink drop diameter and ink drop volume.

To illustrate this relationship, reference is made first to FIG. 2, where the mathematical relationship between ink drop diameter $d_{drop}$ and ink drop volume $V_{drop}$ is depicted in a diagram (assuming an ideal spherical shape of ink drop 1, 1').

As FIG. 2 shows, a theoretical value for the ink drop diameter of $d_{drop}$=58 µm is obtained at an ink drop volume $V_{drop}$ of $V_{drop}$=100 pL, for example. With a reduction in ink drop volume by one half to $V_{drop}$=50 pL, the ink drop diameter still amounts to 46 µm. This means that although the ink drop volume is only half as large so that the depth of penetration is also only about half as deep, the ink drop diameter $d_{drop}$ and/or the ink dot diameter $d_{dot}$ which are important for the ink are reduced by only approximately 20%. With a reduction in ink drop volume $V_{drop}$ to $V_{drop}$=25 pL, i.e., to one-fourth of the original ink drop volume of $V_{drop}$=100 pL, the ink drop diameter $d_{drop}$ still amounts to approximately 36 µm.

Figure 1B:
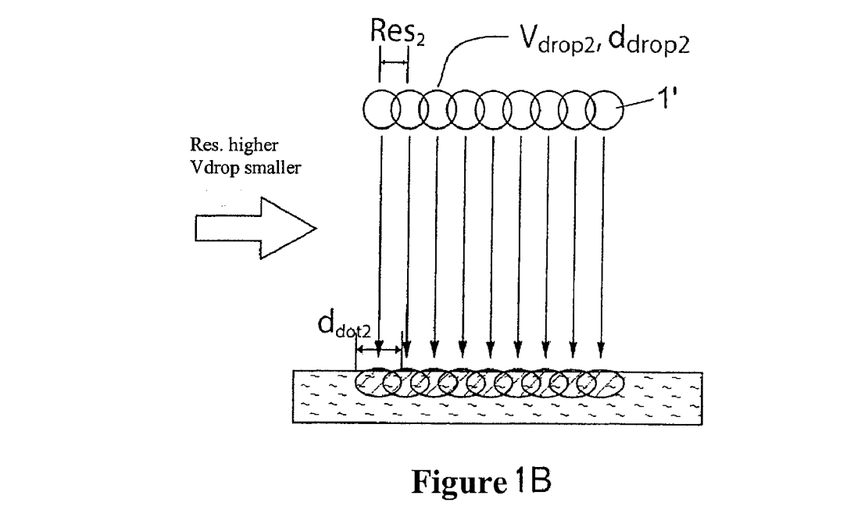
FIG. 1B shows schematically the increase in resolution of the print image according to the first embodiment of the invention.

As shown in FIG. 1B, the user can increase the first resolution $Res_1$ to a second resolution $Res_2$ if an improvement in print quality is desired after reducing the normal quantity of ink to the reduced quantity of ink.

This achieves the result that the surface on the side of the substrate, i.e., newsprint, to be printed is covered approximately the same geometrically in comparison with the normal print quality illustrated at the left in FIG. 1A, so that the optical density, i.e., the geometric coverage of the print image on the front side, is approximately comparable to that of normal print quality. However, the total quantity of ink applied is significantly less and the ink drops 1' penetrate to a much lower depth into the substrate, so the strikethrough effect is much less pronounced, i.e., the measurable optical density caused by the print image on the back side of the substrate is much lower and/or is completely preventable. Thus, from the standpoint of quality, two-sided printing of thin substrates such as newsprint is possible according to the present invention.

In summary, according to the first exemplary embodiment of the present invention, the following steps are performed.

1. Reducing the ink drop volume $V_{drop}$ until the strikethrough effect on a certain substrate is either eliminated or is no longer perceived as causing interference.

2. Increasing the resolution Res until the print surface can either be completely covered or an acceptable degree of coverage is achieved.

Figure 3:
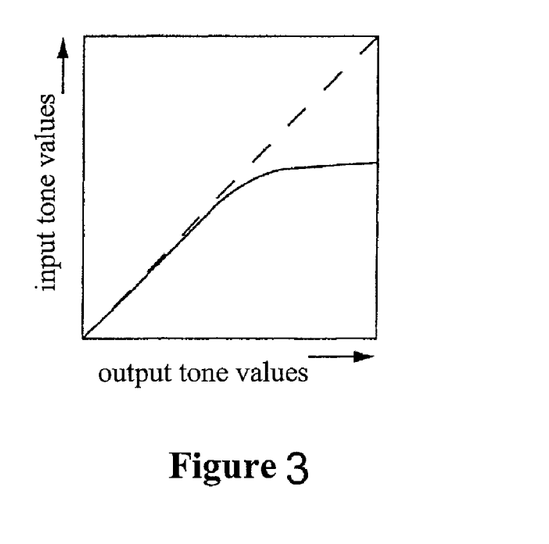
FIG. 3 shows a view of a transfer function and/or gradation curve according to a first embodiment of the invention.

Now with reference to FIG. 3, a second embodiment of the inventive method is described.

First, a normal print quality is again determined. In other words, the user of the inventive method stipulates a normal print quality which is to be evaluated visually, for example, e.g., on the basis of customer specifications.

Then on the basis of the normal print quality, a normal quantity of ink that would be used for inkjet printing of a certain print image on a strikethrough-resistant substrate is determined again. To this end, tone values are defined for different areas of the print image to conform to normal quality.

Next, a minimal print quality is determined for the print image to be printed. In other words, the user stipulates a print quality that is just barely still acceptable and is to be evaluated visually, for example, on the basis of customer specifications.

Furthermore, the user determines a maximal value for the strikethrough effect. In other words, the user stipulates the maximal degree, which is to be evaluated visually on the basis of customer specifications, for example, with which a print image printed on one side (front side) of the substrate, i.e., newsprint, is allowed to appear and/or strikethrough on the other side (back side) of the substrate, i.e., newsprint.

Next, the normal quantity of ink is reduced to a reduced quantity of ink by reducing the geometric coverage of the print image. According to the second embodiment of the invention, this is accomplished as described below.

First, a transfer function or gradation curve is defined as shown in FIG. 3, so that at least some of the starting values of the transfer function or gradation curve are smaller than the respective input values of the transfer function or gradation curve. In other words, the transfer function or gradation curve may be defined so that input tone values, for example, of the print image corresponding to normal quality remain untouched, i.e., unchanged, in light areas, whereas input tone values of the print image corresponding to normal quality close to a full tone are reduced, i.e., lightened, so that a resulting reduced print image meets at least the minimal print quality, and the maximal value of the strikethrough effect is not exceeded. Other configurations are of course also possible.

Next, the defined tone values of the print image corresponding to normal quality are varied by using the tone values as input values for the transfer function or gradation curve and using the output values of the transfer function or gradation curve as new tone values for a print image with a reduced quantity of ink.

Therefore, if the input tone values of the print image remain unchanged for light areas, for example, but the input tone values of the print image close to the full tone are reduced in the dark tones, then the quantity of ink applied per unit of area in the rasterized image is reduced, so that the ink can spread out on the substrate surface, such that the depth of penetration of the ink into the substrate is less than that with a normal quantity of ink, and the strikethrough effect is reduced, i.e., minimized.

Now a third embodiment of the inventive method is described with reference to FIG. 4 and FIG. 5.

First, a normal print quality is again determined. In other words, the user of the inventive method defines the normal print quality for a certain print image to be evaluated on the basis of customer specifications, for example. According to FIG. 4 and FIG. 5, the print image is defined as "A" for example.

Then again on the basis of the normal print quality a normal quantity of ink which would be used for inkjet printing of the print image on a strikethrough-resistant substrate is determined. To this end, the print image corresponding to the normal print quality is converted, i.e., recalculated, to a raster image 2 corresponding to the normal print quality by using, for example, an RIP (raster image processor) which may be implemented in hardware and/or software. The normal quantity of ink is calculated from the fully ripped raster image 2.

Next, a minimal print quality for the print image to be printed is determined. In other words, the user defines on the basis of customer specifications, for example, a print quality that is just barely acceptable and is to be evaluated visually, for example.

Furthermore, the user determines a maximal value for the strikethrough effect. In other words, the user defines on the basis of customer specifications, for example, a maximal degree with which a print image printed on one side (front side) of the substrate, i.e., newsprint, is allowed to appear through, i.e., strikethrough on the other side (back side) of the substrate, i.e., newsprint, such that this maximal degree is to be evaluated visually, for example.

Next, the normal quantity of ink is reduced to a reduced quantity of ink by reducing the geometric coverage of the print image. According to the third embodiment of the invention, this is done as described below.

First, a bit-oriented or pixel-oriented mask 3 whose raster structure is quantitatively reduced in comparison with that of raster image 2 is defined.

Then the raster image 2 is mapped through the bit-oriented or pixel-oriented mask 3, thereby defining a reduced raster image 2', such that the reduced raster image 2' defines a reduced quantity of ink for the print image.

In other words, using the hardware-based or software-implemented bit-oriented or pixel-oriented mask 3, the fully ripped bit map, i.e., raster image 2, is "thinned out" by a logic link to this mask 3, so that the reduced raster image 2' meets at least the minimal print quality and the maximal value of the strikethrough effect is not exceeded.

Figure 4:
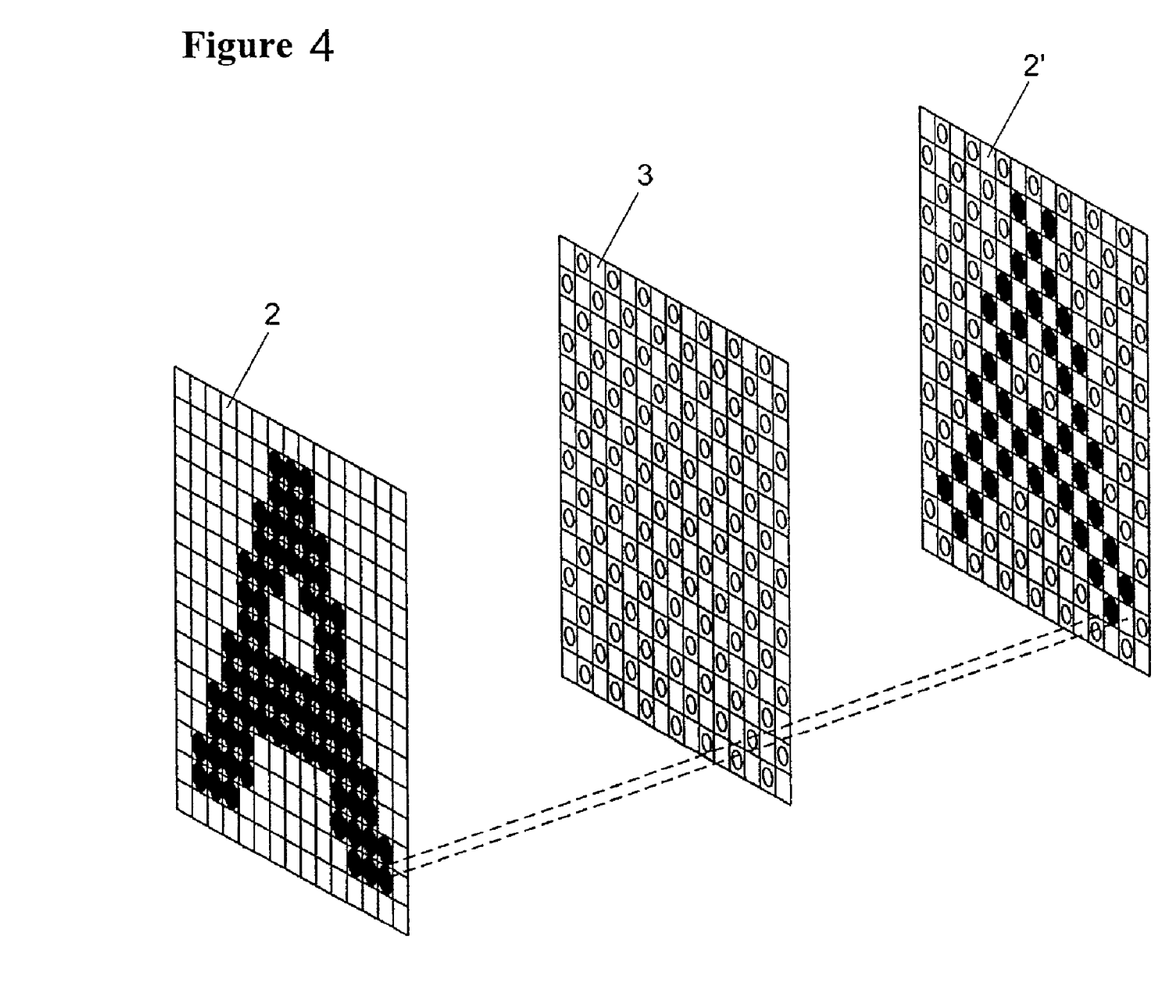
FIG. 4 shows schematically in a perspective diagram the reduction in geometric coverage of a print image by using a bit-oriented or pixel-oriented mask according to a third embodiment of the invention.
Figure 5:
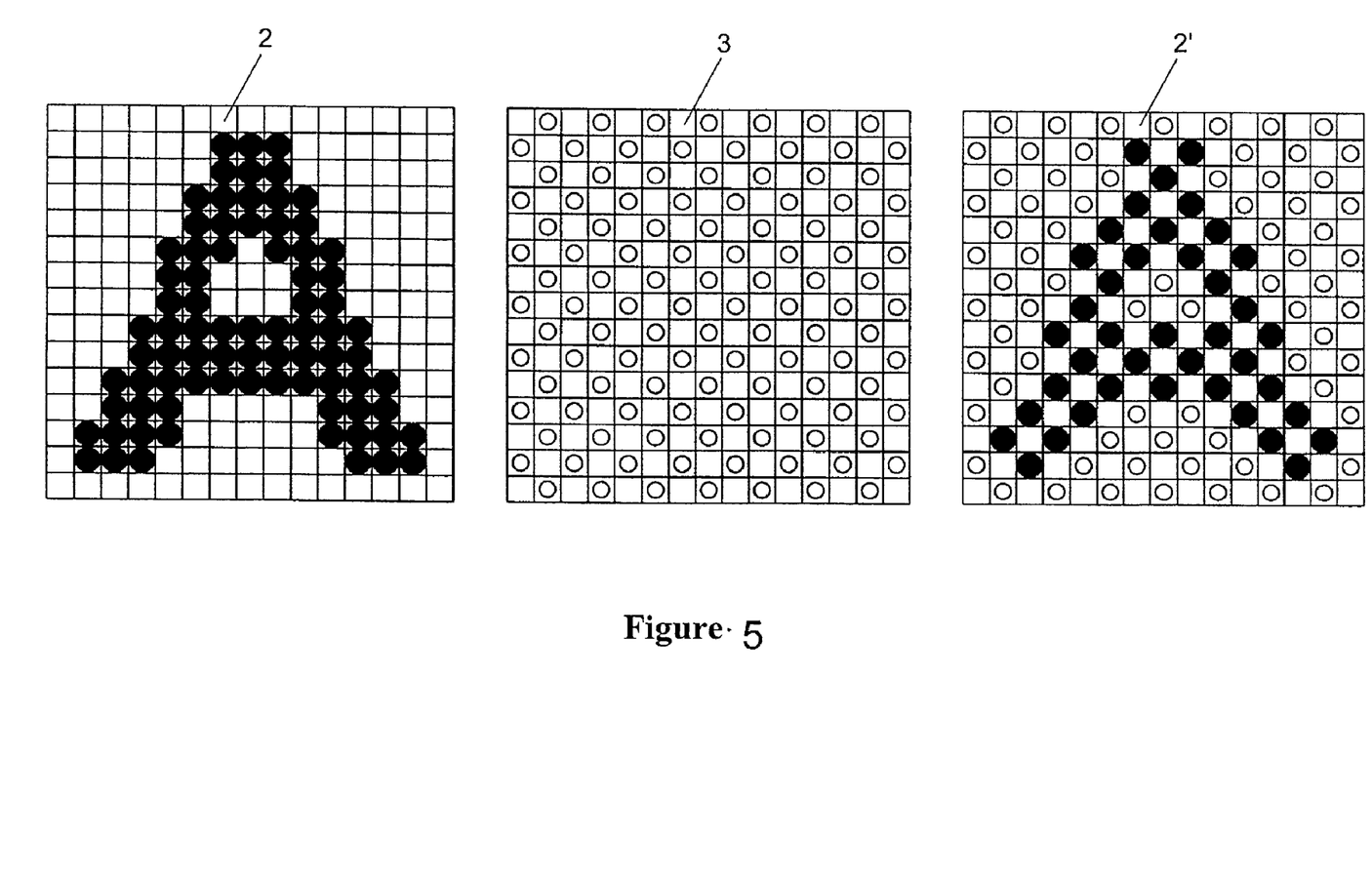
FIG. 5 shows schematically in a view from above the reduction in the geometric coverage of a print image by means of a bit-oriented or pixel-oriented mask according to the third embodiment of the invention.

FIG. 4 and FIG. 5 show the raster structure of the bit-oriented or pixel-oriented mask 3 as an example such that it is quantitatively reduced by 50% in comparison with that of the raster image 2.

In other words, FIG. 4 and FIG. 5 show as an example a regular "thinning out" of the raster image 2, so that the reduced raster image 2' which has been rounded out by pixels by using the mask 3 has only 50% of the original geometric coverage of the raster image 2. The quantity of ink applied in printing is reduced accordingly so that the strikethrough effect is reduced and/or prevented. Just like the example shown here, other regular or randomly distributed bit map masks 3 may also be used with defined "thinning rates."

Now a fourth embodiment of the inventive method will be described with reference to FIG. 6.

First a normal print quality is again determined, i.e., the user of the inventive method defines on the basis of customer specifications, for example, a normal print quality for a certain print image which is to be evaluated visually, for example. According to FIG. 6, the print image is defined as upper case letter "A," for example.

Then again, on the basis of the normal print quality, a normal quantity of ink which would be used for inkjet printing of the print image on a strikethrough-resistant substrate is determined. To this end, the print image corresponding to normal print quality is converted into a raster image 4 corresponding to normal print quality and/or is assigned to a normally rasterized font. The normal ink quantity is then obtained from the raster image 4.

Next a minimal print quality for the print image to be printed is determined. In other words, the user defines on the basis of customer specifications, for example, a print quality that is just barely acceptable and is to be evaluated visually, for example.

Furthermore, the user defines a maximal value for the strikethrough effect. In other words, the user defines on the basis of customer specifications, for example, a maximal degree with which a print image printed on one side (front side) of the substrate, i.e., newsprint, is allowed to appear through, i.e., strikethrough, on the other side (back side) of the substrate, i.e., newsprint, where the maximal degree is to be evaluated visually, for example.

Next the normal quantity of ink is reduced to a reduced quantity of ink by reducing the geometric coverage of the print image. According to the fourth embodiment of the invention, this is done as explained below.

A certain number of pixels are removed from large contiguous areas of the raster image 4, so that the corresponding pixel-reduced raster image 4' meets at least the minimal print quality, and the maximal value of the strikethrough effect is not exceeded.

Figure 6:
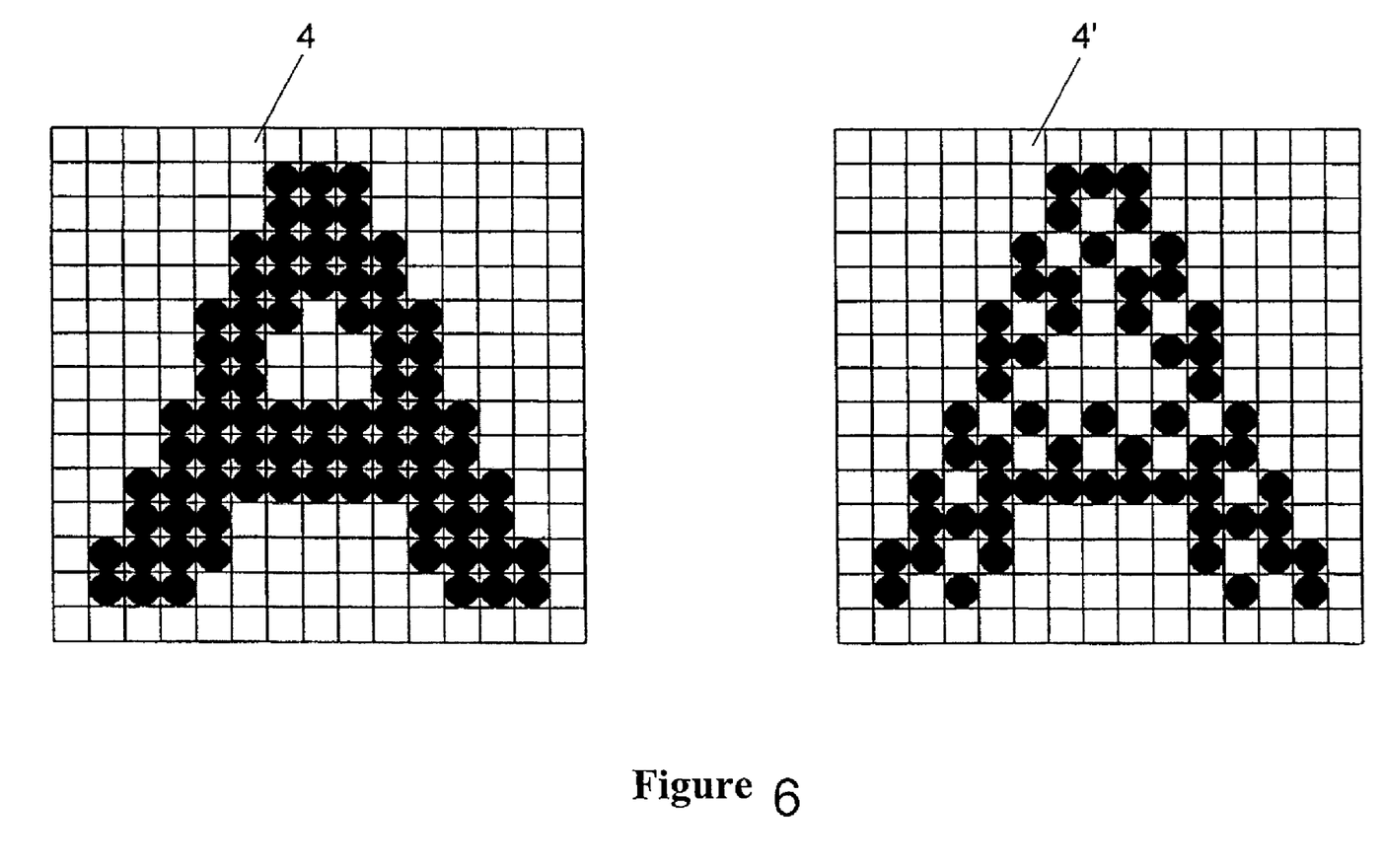
FIG. 6 shows schematically the reduction in the geometric coverage of a print image by removing a certain number of pixels.

According to the example shown in FIG. 6, a certain number of pixels are removed from character sets intended for inkjet printing of text, so that the respective contours of the characters are preserved.

In other words, according to the fourth embodiment of the invention, to reduce the strikethrough effect, specially optimized point-reduced fonts, i.e., character sets, are used. The advantage here is that the contour of the individual letters can be preserved, whereas matrix dots are removed in a targeted manner in those areas where strikethrough is especially disturbing and/or may be greatly pronounced, namely in the large contiguous areas. FIG. 6 shows the matrix dots only symbolically. In reality, the ink dots shown on the substrate, i.e., newsprint, are much larger in diameter, so that the matrix dot gaps are not visible.

Now a fifth embodiment of the inventive method will be described.

First a normal print quality is again determined. In other words, the user of the inventive method defines on the basis of customer specifications, for example, a normal print quality for a certain print image which is to be evaluated visually, for example. According to the fifth embodiment of the invention, the print image is defined as a letter of a character set, i.e., font, for example.

Then on the basis of the normal print quality a normal quantity of ink that would be used for inkjet printing of the print image on a strikethrough-resistant substrate is determined again. To this end, the print image corresponding to the normal print quality is assigned to a font corresponding to normal print quality and having a gray value of 100%, which yields the normal quantity of ink.

Next, a minimal print quality for the print image to be printed is determined. In other words, the user defines on the basis of customer specifications, for example, a print quality which is just barely still acceptable and is to be evaluated visually, for example.

Furthermore, the user determines a maximal value for the strikethrough effect. In other words, the user defines on the basis of customer specifications, for example, a maximal degree with which a print image printed on one side (front side) of the substrate, i.e., newsprint, is allowed to appear through, i.e., strikethrough, on the other side (back side) of the substrate, i.e., newsprint, the maximal degree to be evaluated visually, for example.

Next, the normal quantity of ink is reduced to a reduced quantity of ink by reducing the geometric coverage of the print image.

According to the fifth embodiment of the invention, the normal quantity of ink is reduced to the reduced quantity of ink by reducing the gray value of the print image so that the resulting reduced print image meets at least the minimal print quality and the maximal value of the strikethrough effect is not exceeded. In the example described here, a character set, i.e., a font, having a gray value of less than 100% is defined. In other words, the fonts are not created in the full tone color to reduce the strikethrough effect but instead they have a defined gray value of less than 100%.

The fonts are therefore rasterized automatically in an RIP operation, e.g., according to a raster or dithering scheme stored in the RIP, and the geometric coverage of the print image is reduced accordingly.

LIST OF REFERENCE NUMERALS 1 normal ink drop
1' reduced ink drop
2 normal raster image
2' reduced raster image
3 bit-oriented or pixel-oriented mask
4 normal raster image
4' reduced raster image
$V_{drop}$ ink drop volume
$V_{drop1}$ first ink drop volume
$V_{drop2}$ second ink drop volume
$d_{drop1}$ first ink drop diameter
$d_{drop2}$ second ink drop diameter
$d_{dot1}$ print dot diameter according to normal quantity of ink
$d_{dot2}$ print dot diameter according to reduced quantity of ink
$Res_1$ first resolution
$Res_2$ second resolution The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for reducing a strikethrough effect in inkjet printing on thin substrates, comprising the steps of:
   determining a normal print quality for a print image to be printed;
   determining a normal quantity of ink for inkjet printing of the print image on a strikethrough-resistant substrate, based on the normal print quality;
   determining a minimal print quality for the print image to be printed;
   determining a maximal value for a strikethrough effect; and
   reducing the normal quantity of ink to a reduced quantity of ink, such that the print image has at least the minimal print quality and such that the maximal value for the strikethrough effect is not exceeded.

2. The method according to claim 1, wherein the normal quantity of ink is defined by an ink drop volume, a geometric coverage of the print image on the substrate and a gray value of the print image is defined, and wherein the step of reducing the normal quantity of ink to the reduced quantity of ink is performed by reducing at least one of the ink drop volume, the geometric coverage and the gray value.

3. The method according to claim 2, wherein for the step of determining the normal quantity of ink, a first ink drop volume corresponding to the normal print quality is determined, and wherein the step of reducing the normal quantity of ink to the reduced quantity of ink includes reducing the first ink drop volume to a lower second ink drop volume.

4. The method according to claim 3, wherein the first ink drop volume is reduced by 50% to 75%.

5. The method according to claim 3, wherein the first ink drop volume is determined to be less than 100 pL.

6. The method according to claim 3, wherein the first ink drop volume is determined to be approximately 100 pL and the second ink drop volume is determined to be approximately 50 pL to approximately 25 pL.

7. The method according to claim 3, wherein a resolution corresponding to the normal print quality is set at approximately 300 dpi for the print image.

8. The method according to claim 3, wherein a resolution for the print image corresponding to the normal print quality is defined as being more than 300 dpi.

9. The method according to claim 2, wherein the step of reducing the normal quantity of ink to the reduced quantity of ink is achieved by reducing the geometric coverage of the print image on the substrate.

10. The method according to claim 9, wherein for determining the normal quantity of ink, tone values for different areas of the print image corresponding to the normal quality are defined, and wherein the geometric coverage is reduced by defining a transfer function or a gradation curve, so that at least a portion of output values of the transfer function or gradation curve is less than respective input values of the transfer function or gradation curve and by varying the defined tone values of the print image by using the tone values as input values for the transfer function or gradation curve and defining the output values of the transfer function or gradation curve as novel tone values for the print image.

11. The method according to claim 10, wherein the transfer function or gradation curve is defined so that tone values of the print image remain unchanged in a light area and tone values of the print image close to a full tone are reduced.

12. The method according to claim 9, wherein for the step of determining the normal quantity of ink, a raster image for the print image is formed, and wherein the geometric coverage is reduced by forming a bit-oriented or pixel-oriented mask whose raster structure is quantitatively reduced in comparison with that of the raster image, and by mapping the raster image through the bit-oriented or pixel-oriented mask, so that a reduced raster image is formed.

13. The method according to claim 12, wherein the raster structure of the bit-oriented or pixel-oriented mask is embodied so that it is quantitatively reduced in comparison with that of the raster image.

14. The method according to claim 9, wherein for determining the normal quantity of ink, a raster image of the print image is defined, and wherein the geometric coverage is reduced by removing a certain number of pixels in contiguous areas of the raster image so that a reduced raster image is formed.

15. The method according to claim 14, wherein for inkjet printing of text with characters, a number of pixels are removed so that contours of the characters are preserved.

16. The method according to claim 2, wherein the step of reducing the normal quantity of ink to the reduced quantity of ink is performed by reducing the gray value of the print image.

17. The method according to claim 16, wherein character sets with a gray value of less than 100% are defined for inkjet printing of text.

* * * * *